United States Patent
Buck, Jr. et al.

(10) Patent No.: US 9,569,952 B2
(45) Date of Patent: Feb. 14, 2017

(54) SYSTEMS AND METHODS FOR INDIVIDUAL TRACKING USING MULTI-SOURCE ENERGY HARVESTING

(71) Applicant: BI Incorporated, Boulder, CO (US)

(72) Inventors: James J. Buck, Jr., Longmont, CO (US); Joseph P. Newell, Louisville, CO (US); Cady Lynn Brooks, Nederland, CO (US)

(73) Assignee: BI Incorporated, Boulder, CO (US)

( * ) Notice: Subject to any disclaimer, the term of this patent is extended or adjusted under 35 U.S.C. 154(b) by 5 days.

(21) Appl. No.: 14/611,321

(22) Filed: Feb. 2, 2015

(65) Prior Publication Data

US 2015/0228184 A1 Aug. 13, 2015

Related U.S. Application Data

(60) Provisional application No. 61/938,808, filed on Feb. 12, 2014.

(51) Int. Cl.
*G08B 1/08* (2006.01)
*G08B 25/10* (2006.01)
*H04W 4/02* (2009.01)
*G08B 21/02* (2006.01)
*G08B 21/22* (2006.01)

(52) U.S. Cl.
CPC ........... *G08B 25/10* (2013.01); *G08B 21/0202* (2013.01); *G08B 21/22* (2013.01); *H04W 4/02* (2013.01)

(58) Field of Classification Search
CPC ..................................................... G08B 25/10
USPC ................................................... 340/539.13
See application file for complete search history.

(56) References Cited

U.S. PATENT DOCUMENTS

| | | |
|---|---|---|
| 7,930,927 B2 | 4/2011 | Cooper et al. |
| 8,493,219 B2 | 7/2013 | Buck et al. |
| 8,576,065 B2 | 11/2013 | Buck et al. |
| 8,629,776 B2 | 1/2014 | Buck et al. |
| 8,657,744 B2 | 2/2014 | Rompa et al. |
| 8,862,378 B2* | 10/2014 | Curatolo ............... G01S 5/0036 340/539.1 |
| 9,240,118 B2 | 1/2016 | Melton |
| 9,241,659 B2 | 1/2016 | Rompa et al. |
| 2011/0154887 A1 | 6/2011 | Cooper et al. |
| 2012/0235860 A1* | 9/2012 | Ghazarian ............... G01S 19/16 342/357.4 |
| 2013/0006066 A1 | 1/2013 | Melton |
| 2015/0048948 A1 | 2/2015 | Buck et al. |
| 2015/0061864 A1 | 3/2015 | Buck et al. |
| 2015/0078622 A1 | 3/2015 | Buck et al. |
| 2015/0131085 A1 | 5/2015 | Cooper et al. |
| 2015/0279200 A1 | 10/2015 | Buck et al. |
| 2015/0327214 A1 | 11/2015 | Buck et al. |

OTHER PUBLICATIONS

U.S. Appl. No. 13/919,862, filed Jun. 17, 2013, Newell et al.
U.S. Appl. No. 14/966,135, filed Dec. 11, 2015, Donald A. Melton.

* cited by examiner

*Primary Examiner* — Qutbuddin Ghulamali
(74) *Attorney, Agent, or Firm* — Hamilton, DeSanctis & Cha

(57) ABSTRACT

The present inventions are related to monitoring movement, and in particular to systems and methods for extending the service life of a monitoring device.

20 Claims, 5 Drawing Sheets

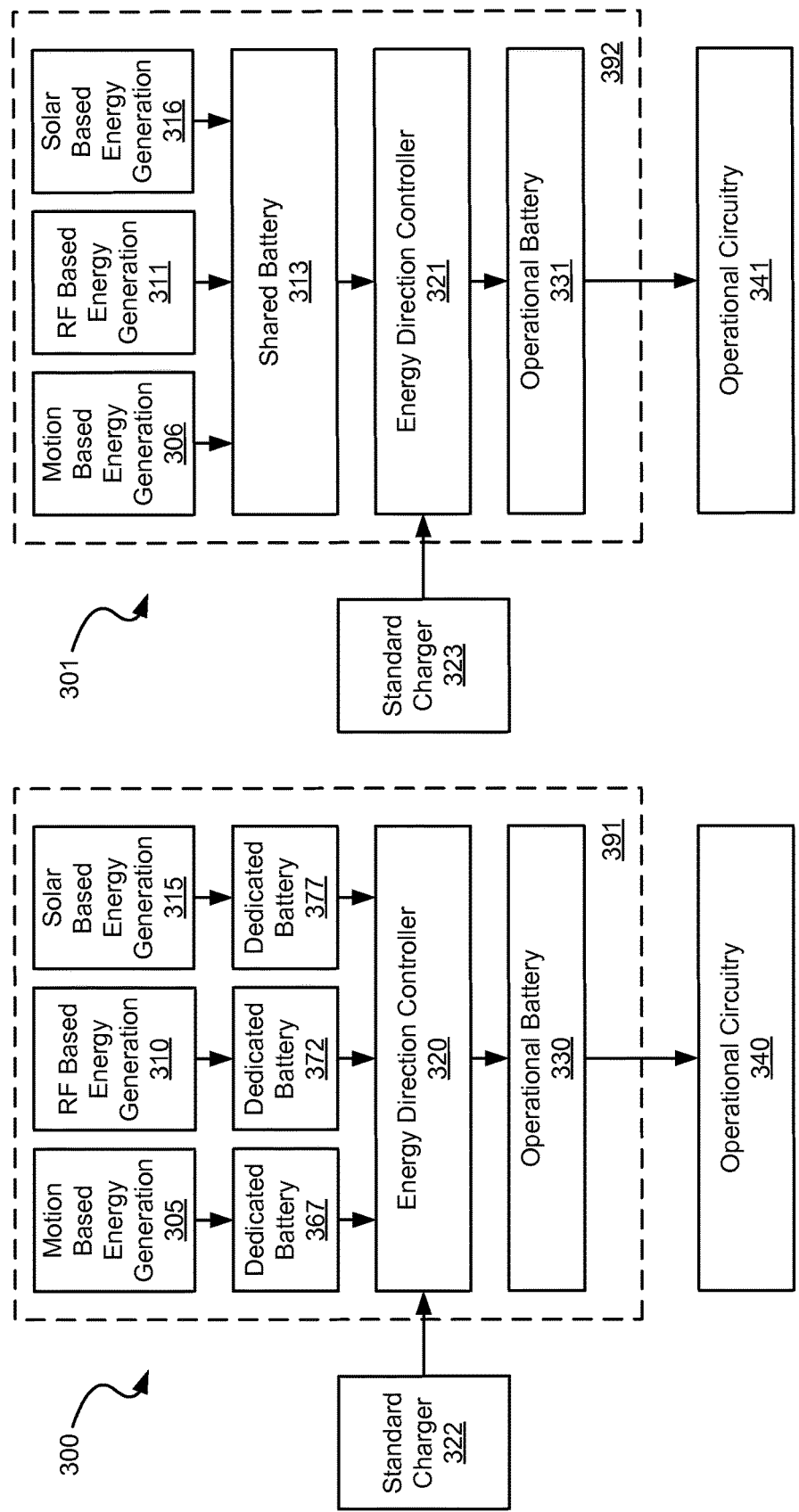

SYSTEMS AND METHODS FOR INDIVIDUAL TRACKING USING MULTI-SOURCE ENERGY HARVESTING

CROSS REFERENCE TO RELATED APPLICATIONS

The present application claims priority to (is a non-provisional of) U.S. Pat. App. No. 61/938,808 entitled "Systems and Methods for Target Monitoring Using Mobile Power Source", and filed Feb. 12, 2014 by Buck et al. The entirety of the aforementioned provisional patent applications is incorporated herein by reference for all purposes.

BACKGROUND OF THE INVENTION

The present inventions are related to monitoring movement, and in particular to systems and methods for extending the service life of a monitoring device.

Large numbers of individuals are currently housed in prisons. This represents a significant cost to society both in terms of housing expense and wasted productivity. To address this concern, house arrest systems have been developed for use by less violent offenders. This allows the less violent offender to be monitored outside of a traditional prison system and allows the offender an opportunity to work and interact to at least some degree in society. The same approach is applied to paroled prisoners allowing for a monitored transition between a prison atmosphere and returning to society. House arrest systems typically require attaching a monitoring device to a monitored individual that must be periodically recharged. Such recharging interferes with the operation of the device, and at times failure to recharge results in a temporary failure of the device.

Thus, for at least the aforementioned reasons, there exists a need in the art for more advanced approaches, devices and systems for individual monitoring.

BRIEF SUMMARY OF THE INVENTION

The present inventions are related to monitoring movement, and in particular to systems and methods for extending the service life of a monitoring device.

Various embodiments of the present invention provide monitoring systems that include: a monitor device and a connector device. The monitor device is operable to monitor a status of the monitor target and powered by an operational battery. The connector device operable to secure the monitor device to the monitor target. The monitor device includes an energy harvesting circuit operable to direct charge from any of three sources: a non-opportunistic charge circuit, a first opportunistic charge circuit, and a second opportunistic charge circuit.

This summary provides only a general outline of some embodiments according to the present invention. Many other objects, features, advantages and other embodiments of the present invention will become more fully apparent from the following detailed description, the appended claims and the accompanying drawings and figures.

BRIEF DESCRIPTION OF THE DRAWINGS

A further understanding of the various embodiments of the present invention may be realized by reference to the figures which are described in remaining portions of the specification. In the figures, similar reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 3a depicts one implementation of an energy harvesting circuit in accordance with some embodiments of the present invention;

FIG. 3b depicts another implementation of an energy harvesting circuit in accordance with other embodiments of the present invention;

DETAILED DESCRIPTION OF THE INVENTION

Figure 1:
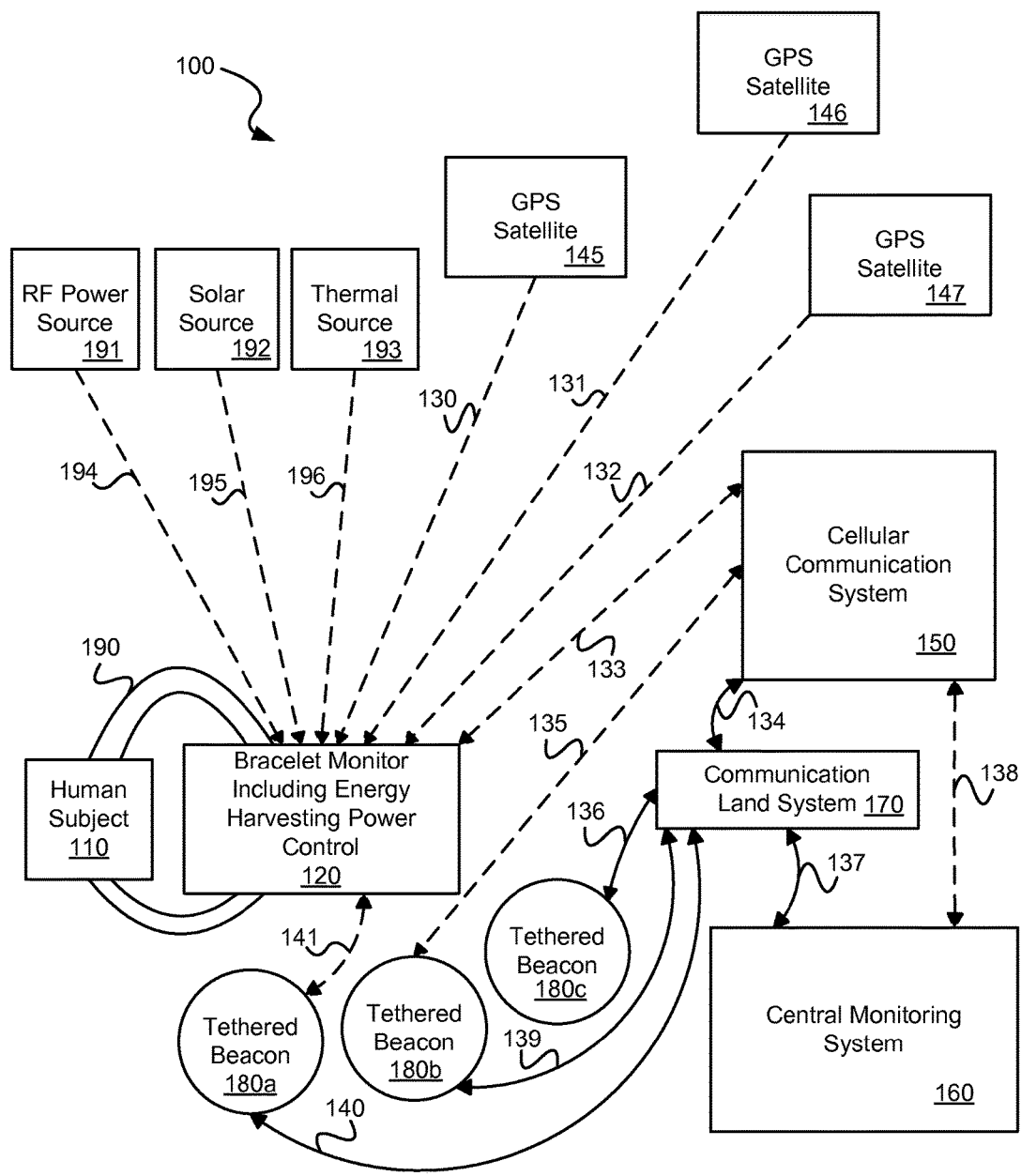
FIG. 1 is a block diagram illustrating a monitoring system including a subject device in the form of a bracelet monitor that includes energy harvesting power control in accordance with various embodiments of the present invention.

The present inventions are related to monitoring movement, and in particular to systems and methods for extending the service life of a monitoring device.

Various embodiments of the present invention provide monitoring systems that include: a monitor device and a connector device. The monitor device is operable to monitor a status of the monitor target and powered by an operational battery. The connector device operable to secure the monitor device to the monitor target. The monitor device includes an energy harvesting circuit operable to direct charge from any of three sources: a non-opportunistic charge circuit, a first opportunistic charge circuit, and a second opportunistic charge circuit.

In some instances of the aforementioned embodiments, the monitoring system further includes a central monitoring computer operable to receive the status of the monitor target from the monitor device. In one or more instances of the aforementioned embodiments, the status of the monitor target may be one of a tamper status of the connector device, a location of the monitor target, or a motion status. In some cases, the non-opportunistic charge circuit is operable to charge the operational battery using charge derived from a wall powered connection under control of the monitor target.

In one or more instances of the aforementioned embodiments, the first opportunistic charge circuit may be one of an RF energy based charging circuit, a solar based charging circuit, or a movement based charging circuit. In some cases, the second opportunistic charging circuit is a different type of charging circuit from that of the first opportunistic charging circuit. In some instances of the aforementioned embodiments, the second opportunistic charging circuit is a different type of charging circuit from that of the first opportunistic charging circuit, and both the first opportunistic charge circuit and the second opportunistic charging circuit may be one of an RF energy based charging circuit, a solar based charging circuit, or a movement based charging circuit.

In various instances of the aforementioned embodiments, the monitor device further includes a secondary battery associated with at least one of the first opportunistic charge circuit and the second opportunistic charge circuit. In some cases, the monitor device includes circuitry operable to transfer charge from the secondary battery to the operational battery. In particular cases, the secondary battery includes a first battery electrically coupled to the first opportunistic charge circuit and a second battery electrically coupled to the second opportunistic charge circuit.

Other embodiments provide methods for tracking an individual that include: charging an operational battery of a monitor device using a non-opportunistic charging circuit; attaching the monitor device to the individual using a connector device; monitoring and reporting a status of the individual by the monitor device; and charging the operational battery of the monitor device using one or more of at least two available opportunistic charging circuits.

Turning to FIG. 1, a tracking and monitoring system 100 including a subject device in the form of a bracelet monitor that includes energy harvesting power control in accordance with various embodiments of the present invention. Tracking and monitoring system 100 may be tailored for tracking human subjects as is referred to in this detailed description. However, it should be noted that various implementations and deployments of tracking and monitoring system 100 may be tailored for tracking other animals or even inanimate objects such as, for example, automobiles, boats, equipment, shipping containers or the like.

Tracking and monitoring system 100 includes a subject device that may be, but is not limited to, a bracelet monitor 120 that is physically coupled to a human subject 110 by a securing device 190. In some cases, securing device 190 is a strap that includes a continuity sensor that when broken indicates an error or tamper condition and an interfering element that reduces the possibility of a connection being falsely reported when securing device 190 is disconnected. Further, in some cases, bracelet monitor 120 includes a proximity sensor that is able to detect when it has been moved away from an individual being monitored. When such movement away from the individual is detected, an error or tamper condition may be indicated. Such tamper detection circuitry is referred to herein as standard tamper detection circuitry. Based on the disclosure provided herein, one of ordinary skill in the art will recognize a variety of tamper sensors that may be incorporated in either bracelet monitor 120 or securing device 190 to allow for detection of removal of bracelet monitor 120 or other improper or unexpected meddling with bracelet monitor 120.

Additionally, bracelet monitor 120 may be designed to provide the location of human subject 110 under a number of conditions. For example, when bracelet monitor 120 is capable of receiving wireless GPS location information 130, 131, 132 from a sufficient number of GPS satellites 145, 146, 147 respectively, bracelet monitor 120 may use the received wireless GPS location information to calculate or otherwise determine the location of human subject 110. Alternatively or in addition, the location of a tethered beacon 180 that is local to bracelet monitor 120 may be used as the location of bracelet monitor 120. As yet another alternative, an AFLT fix may be established based on cellular communication with bracelet monitor 120. It should be noted that other types of earth based triangulation may be used in accordance with different embodiments of the present invention. For example, other cell phone based triangulation, UHF band triangulation such as Rosum, Wimax frequency based triangulation, S-5 based triangulation based on spread spectrum 900 MHz frequency signals. Based on the disclosure provided herein, one of ordinary skill in the art will recognize other types of earth based triangulation that may be used.

As yet another alternative, an AFLT fix may be established based on cellular communications between bracelet monitor 120 and a cellular communication system 150. Furthermore, when wireless communication link 133 between bracelet monitor 120 and cellular communications system 150 is periodically established, at those times, bracelet monitor 120 may report status and other stored records including location fixes to a central monitoring system 160 via wireless communication link 138.

Bracelet monitor 120 includes two or more energy harvesting power control circuits in addition to standard recharge capability. In particular, bracelet monitor 120 includes one or more batteries that must be recharged in order to facilitate tracking of human subject 110 when human subject 110 is mobile. Standard recharge capability including, for example, a battery recharger that may be connected by a wire to a power source such as a wall outlet is included in bracelet monitor 120. Such standard recharge capability is referred to herein as "non-opportunistic" as it requires a specific action on the part of human subject 110 to accomplish the charging. In contrast, bracelet monitor 120 additionally includes two or more opportunistic charging capabilities. Such "opportunistic" charging capabilities take advantage of power that can be captured to recharge batteries of bracelet monitor 120 that do not require specific action on the part of human subject. For example, the two or more opportunistic charging capabilities may be selected from a solar charging capability, a motion based charging capability, a radio frequency (RF) energy based charging capability, or other similar opportunistic charging capabilities. Solar energy is referred to as an "opportunistic" capability because the natural movement of human subject 110 unrelated to a need to charge bracelet monitor 120 will often bring them into sunlight and thus facilitate the charging. Similarly, RF energy based charging capability is referred to as another "opportunistic" capability because the natural movement of human subject 110 unrelated to a need to charge bracelet monitor 120 will often move them through RF energy fields that can be used for charging. Similarly, motion based charging capability is referred to as another "opportunistic" capability because the natural movement of human subject 110 unrelated to a need to charge bracelet monitor 120 results in motion of bracelet monitor 120 that can be converted to electrical energy. Based upon the disclosure provided herein, one of ordinary skill in the art will recognize a variety of opportunistic capabilities that may be used to charge bracelet monitor 120 in accordance with different embodiments of the present invention.

Additionally, tracking and monitoring system 100 may include one or more tethered beacons 180. Within FIG. 1, a telemetric wireless link 141 has been depicted between tethered beacon 180a and bracelet monitor 120. Each tethered beacon 180 has an adjustable range to make telemetric wireless contact with bracelet monitor 120. At any point in time, depending on each beacon's 180 relative distance to bracelet monitor 120, none, one, or more than one tracking beacons 180 may be within transmission range of a single bracelet monitor 120. Likewise, it is further conceivable under various circumstances that more than one bracelet monitor 120 at times be within in range of a solitary tethered beacon 180. Of note, the RF energy emitted by tethered beacons 180 may be captured where bracelet monitor 120 includes an RF energy based charging capability.

Telemetric wireless communications path 141 established at times between tethered beacon 180a and bracelet monitor 120. In some more simplified configurations and embodiments, each tethered beacon 180 is limited to repetitively transmitting its own beacon ID and motion sensor information. In that way, once bracelet monitor 120 is within transmission range of tethered beacon 180a and establishes wireless or wired reception 141, then bracelet monitor 120 can record and store received beacon ID. In particular cases where tethered beacon 180 is programmed with its physical location in addition to its beacon ID, the physical location information may also be repetitively transmitted. At a later time, for some embodiments of the present invention, bracelet monitor 120 can then report recorded readings from beacons 180 to the central monitoring system 160 over the cellular communication system 150 using wireless links 133 and 138 as depicted in FIG. 1. Furthermore, many embodiments allow for such transmissions and information passing to occur without being noticed by human subject 110, and unnoticed, automatically, and near effortlessly central monitoring system 160 is able to establish records and track human subject's 110 movements and whereabouts.

Of note, a particular tethered beacon 180 includes a beacon ID which may be, but is not limited to, a beacon identification number. This beacon identification number is transmitted to a bracelet monitor in proximity of the particular tethered beacon. This identification number may be associated with a known location of the tethered beacon. As tracking and monitoring system 100 relies on the location associated with the beacon ID provided from the tethered beacon 180 to establish the location of bracelet monitor 120, moving the particular tethered beacon away from the known location undermines the integrity of information provided from bracelet monitor 120 to central monitoring system 160. To avoid this, each of tethered beacons 180 are tethered to a fixed location power source that controls a level of motion sensing provided by the tethered beacon. Tethering beacons 180 to a power source may be done, for example, by connecting the tethered beacon to an AC wall outlet, connecting the tethered beacon to a telephone jack, connecting the tethered beacon to a cable jack, or the like. Based upon the disclosure provided herein, one of ordinary skill in the art will recognize a variety of non-movable power sources to which tethered beacons 180 may be connected in accordance with different embodiments of the present invention.

Tethered beacons 180 each include a multi-level motion sensing circuit that is operable to determine whether a respective tethered beacon 180 is moving. When a particular tethered beacon 180 is connected to a power source, a low sensitivity motion sensor circuit is employed to determine motion. In contrast, when the particular tethered beacon 180 is not connected to a power source, a high sensitivity motion sensor circuit is employed to determine motion. Thus, when tethered beacon 180 is connected to a power source and is less likely to be the subject of problematic motion (i.e., motion that impacts the integrity of location data transferred from bracelet monitor 120 to central monitoring system 160), the motion sensing employed is less sensitive. As such, the possibility of a false positive (e.g., indicating motion of the tethered beacon caused by loud music playing near the tethered beacon) when the tethered beacon 180 is unlikely to be moving is reduced. In contrast, the possibility of problematic motion is increased when tethered beacon 180 is disconnected from the power source, and in such a scenario the motion detection sensitivity is increased. In some cases, tethered beacons 180 include GPS and/or cellular communication based location circuitry that is turned on when motion is detected to obtain an updated location.

In other embodiments or configurations according to the present invention, each tethered beacon 180 also transmit status information related to its own device health and information related from each beacon's 180 internal tampering, movement, or other sensors via a communication system 170 to central monitoring system 160. This allows for detection of movement of beacons 180, and establishing some level of confidence that the physical location associated with each of beacons 180 is accurate.

Likewise, in some other embodiments, each bracelet monitor 120 contains a host of their own tampering, shielding, movement, and/or other sensors related to its own device health. While still further embodiments also include a host of other measurement transducers within bracelet monitor 120 for extracting information, and for later reporting, related to physical properties of human subject 110. For example, measuring for the presence of alcohol and/or other drugs present in human subject 110 may be included in some embodiments of bracelet monitor 120. As one example, the alcohol sensor discussed in U.S. Pat. No. 7,930,927 entitled "Transdermal Portable Alcohol Monitor and Methods for Using Such" and filed by Cooper et al. on Mar. 4, 2008. The entirety of the aforementioned reference is incorporated herein by reference for all purposes.

Tethered beacons 180 in alternative embodiments of the present invention also communicate with central monitoring system 160 independently of bracelet monitor 120. The tracking and monitoring system 100 illustrated in FIG. 1 shows tethered beacon 180b having both a wireless communication link 135 with cellular communication system 150, and also illustrates tethered beacon 180b having a hardwired communication link 139 with land communication system 170. Tracking and monitoring system 100 is also shown with tethered beacons 180a, 180b, and 180c each having hardwired land communication links 140, 139, and 136 respectively to land communication system 170. Tracking and monitoring system 100 further illustrates land communication system 170 having a hardwired communication link 134 to cellular communication system 150, and a hardwired communication link 137 to central monitoring system 160.

In some embodiments of the present invention, tethered beacons 180 are located in areas frequented by human subject 110 where bracelet monitor 120 is incapable of accessing information from the GPS system, or simply where power used accessing information from a GPS or cellular location system can be saved. Such beacons eliminate the need to perform an AFLT fix and avoid the costs associated therewith. As an example, human subject 110 may have a tethered beacon 180 placed within his home, and one also placed at his place of employment in close proximity to his work area. In this way, the two placed beacons, each at different prescribed times, can interact with his attached bracelet monitor 120 to periodically make reports to central monitoring system 160 to track movements and the whereabouts of human subject 110. All this can be done without incurring the costs associated with performing an AFLT fix.

Figure 2:
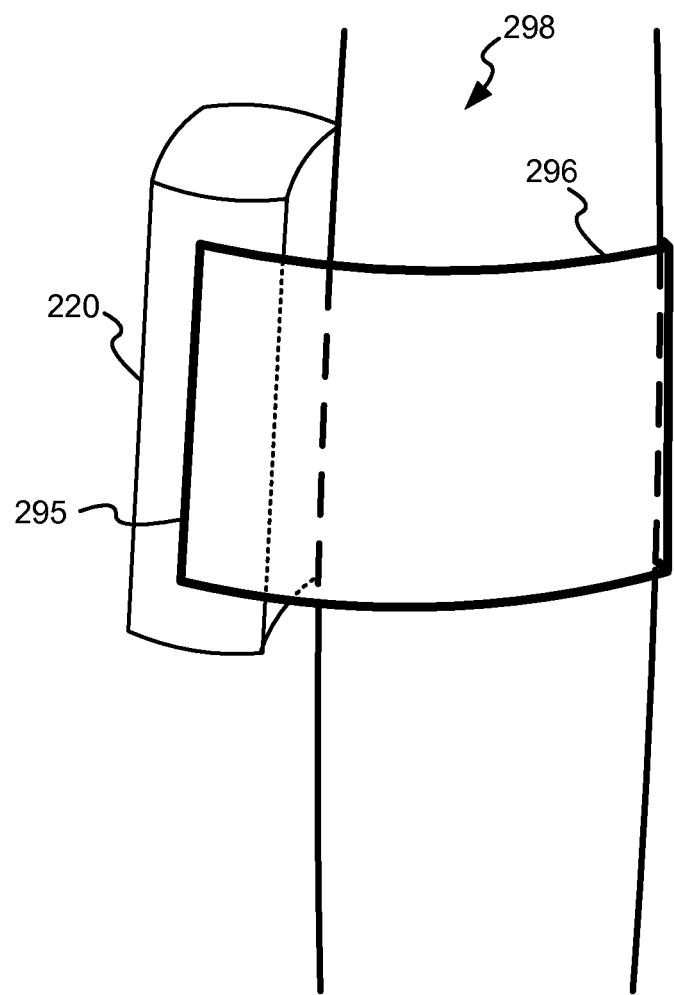
FIG. 2 shows a bracelet monitoring system installed on a human leg.

Turning to FIG. 2, a subject device 220 is shown deployed against a leg 298 of a monitored individual. As shown, a strap 296 holds subject device 220 in place against leg 298 with a buckle 297 securing a first strap end 293 to a second strap end 292. An end 295 of strap 296 is connected to subject device 220.

Turning to FIG. 3a, one implementation of a bracelet monitor 300 including an energy harvesting circuit 391 is shown in accordance with some embodiments of the present invention. Energy harvesting circuit 391 may be included in bracelet monitor 120 discussed above in relation to FIG. 1. Energy harvesting circuit 391 includes a motion based energy generation circuit 305. Motion based energy generation circuit 305 may be any circuit known in the art that is capable of deriving energy from motion including, but not limited to, the motion or vibration resulting from movement of a human subject to which energy harvesting circuit is attached. Additionally, energy harvesting circuit 391 includes an RF based energy generation circuit 310. RF based energy generation circuit 310 may be any circuit known in the art that is capable of deriving energy from RF fields through which energy harvesting circuit 310 passes including, but not limited to, RF energy from RFID readers or other RF energy emitting devices. Additionally, energy harvesting circuit 391 includes a solar based energy generation circuit 315. Solar based energy generation circuit 315 may be any circuit known in the art that is capable of deriving energy from solar or other light sources impinging upon a bracelet monitor housing energy harvesting circuit 310 passes including, but not limited to, a standard solar panel based energy accumulation circuit and device.

Energy captured by motion based energy generation circuit 305 is diverted to a dedicated battery 367. Use of such a dedicated battery allows for capture of electrical charge by motion based energy generation circuit 305 regardless of the unused charge capacity of any of the other batteries in energy harvesting circuit 391. Energy captured by RF based energy generation circuit 310 is diverted to a dedicated battery 372. Use of such a dedicated battery allows for capture of electrical charge by RF based energy generation circuit 310 regardless of the unused charge capacity of any of the other batteries in energy harvesting circuit 391. Energy captured by Solar based energy generation circuit 315 is diverted to a dedicated battery 377. Use of such a dedicated battery allows for capture of electrical charge by solar based energy generation circuit 315 regardless of the unused charge capacity of any of the other batteries in energy harvesting circuit 391.

Energy harvesting circuit 391 further includes an energy direction controller circuit 320. Energy direction controller circuit 320 directs energy from a standard charger circuit 322 when such energy is available. Energy charger circuit 322 may be for example, a standard wired charger converting energy available from a fixed power source such as a wall socket into charge suitable for recharging an operational battery 330. When energy is being provided by standard charger circuit 322, no charge is transferred from any of dedicated batteries 367, 372, 377, but rather that charge remains in the dedicated batteries. During this time dedicated batteries 367, 372, 377 may continue charging dependent upon availability of the corresponding opportunistic charging source.

In contrast, when energy is not being provided by standard charger circuit 322, energy direction controller circuit 320 determines whether operational battery 330 is sufficiently discharged to allow for taking on additional charge. Where it is determined that operational battery 330 is sufficiently discharged, energy direction controller circuit 320 directs transfer of charge from one or more of dedicated batteries 367, 372, 377 to operational battery 330. Operational battery 330 supplies power to operational circuitry 340. Such operational circuitry 340 includes, but is not limited to, all of the circuitry performing the various functions discussed above in relation to bracelet monitor 120 of FIG. 1.

Turning to FIG. 3b, another implementation of a bracelet monitor 301 including an energy harvesting circuit 392 is shown in accordance with some embodiments of the present invention. Energy harvesting circuit 392 may be included in bracelet monitor 120 discussed above in relation to FIG. 1. Energy harvesting circuit 392 includes a motion based energy generation circuit 306. Motion based energy generation circuit 306 may be any circuit known in the art that is capable of deriving energy from motion including, but not limited to, the motion or vibration resulting from movement of a human subject to which energy harvesting circuit is attached. Additionally, energy harvesting circuit 392 includes an RF based energy generation circuit 311. RF based energy generation circuit 311 may be any circuit known in the art that is capable of deriving energy from RF fields through which energy harvesting circuit 311 passes including, but not limited to, RF energy from RFID readers or other RF energy emitting devices. Additionally, energy harvesting circuit 392 includes a solar based energy generation circuit 316. Solar based energy generation circuit 316 may be any circuit known in the art that is capable of deriving energy from solar or other light sources impinging upon a bracelet monitor housing energy harvesting circuit 311 passes including, but not limited to, a standard solar panel based energy accumulation circuit and device.

Energy captured by motion based energy generation circuit 306, by RF based energy generation circuit 311, and solar based energy generation circuit 316 is diverted to a shared battery 313. Use of such a shared battery allows for capture of electrical charge by the opportunistic charging sources. Use of such a shared battery allows for charging above the charge storable by an operational battery 331.

Energy harvesting circuit 392 further includes an energy direction controller circuit 321. Energy direction controller circuit 321 directs energy from a standard charger circuit 323 when such energy is available. Energy charger circuit 323 may be for example, a standard wired charger converting energy available from a fixed power source such as a wall socket into charge suitable for recharging an operational battery 331. When energy is being provided by standard charger circuit 323, no charge is transferred from shared battery 313, but rather that charge remains in shared battery 313. During this time shared battery 313 may continue charging dependent upon availability of any of the opportunistic charging sources.

In contrast, when energy is not being provided by standard charger circuit 323, energy direction controller circuit 321 determines whether operational battery 331 is sufficiently discharged to allow for taking on additional charge. Where it is determined that operational battery 331 is sufficiently discharged, energy direction controller circuit 321 directs transfer of charge from shared battery 313 to operational battery 331. Operational battery 331 supplies power to operational circuitry 341. Such operational circuitry 341 includes, but is not limited to, all of the circuitry performing the various functions discussed above in relation to bracelet monitor 120 of FIG. 1.

Figure 3C:
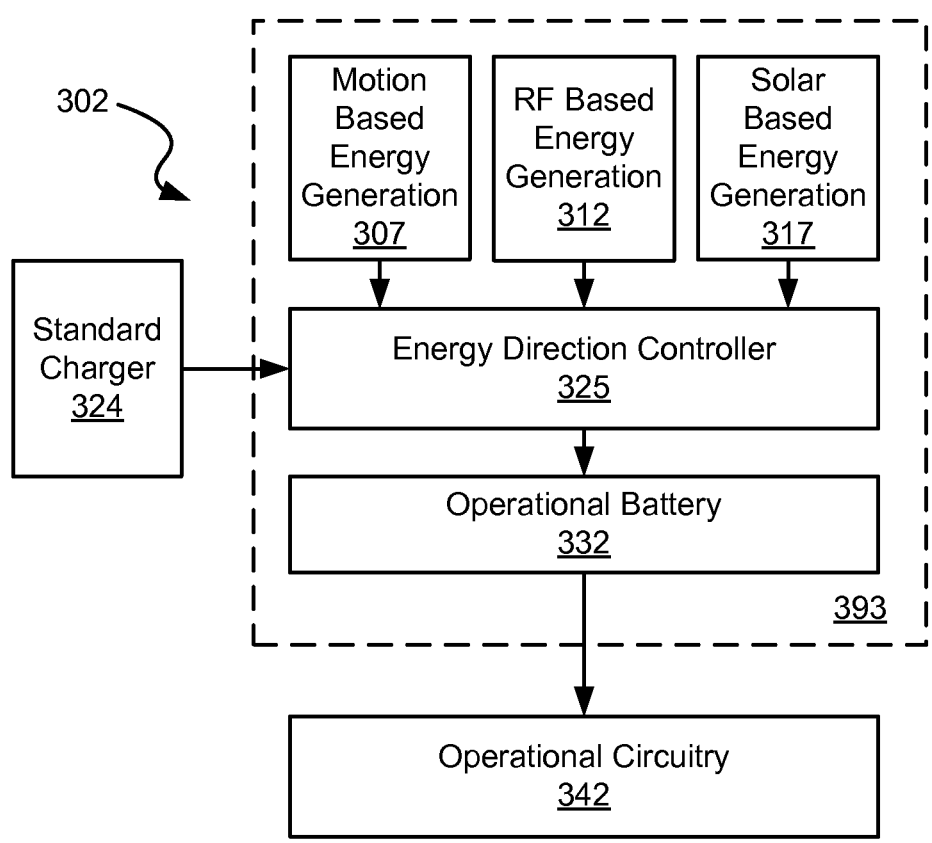
FIG. 3c depicts yet another implementation of an energy harvesting circuit in accordance with various embodiments of the present invention.

Turning to FIG. 3c, another implementation of a bracelet monitor 302 including an energy harvesting circuit 393 is shown in accordance with some embodiments of the present invention. Energy harvesting circuit 393 may be included in bracelet monitor 120 discussed above in relation to FIG. 1. Energy harvesting circuit 393 includes a motion based energy generation circuit 307. Motion based energy generation circuit 307 may be any circuit known in the art that is capable of deriving energy from motion including, but not limited to, the motion or vibration resulting from movement of a human subject to which energy harvesting circuit is attached. Additionally, energy harvesting circuit 393 includes an RF based energy generation circuit 312. RF based energy generation circuit 312 may be any circuit known in the art that is capable of deriving energy from RF fields through which energy harvesting circuit 312 passes including, but not limited to, RF energy from RFID readers or other RF energy emitting devices. Additionally, energy harvesting circuit 393 includes a solar based energy generation circuit 317. Solar based energy generation circuit 317 may be any circuit known in the art that is capable of deriving energy from solar or other light sources impinging upon a bracelet monitor housing energy harvesting circuit 312 passes including, but not limited to, a standard solar panel based energy accumulation circuit and device.

Energy captured by motion based energy generation circuit 307, by RF based energy generation circuit 312, and solar based energy generation circuit 317 is directed to an operational battery 332 by an energy direction controller circuit 325. Energy direction controller circuit 325 directs energy from a standard charger circuit 324 when such energy is available. Energy charger circuit 325 may be for example, a standard wired charger converting energy available from a fixed power source such as a wall socket into charge suitable for recharging an operational battery 332. When energy is being provided by standard charger circuit 324, no charge is transferred from any of the opportunistic charging sources.

In contrast, when energy is not being provided by standard charger circuit 324, energy direction controller circuit 325 determines whether operational battery 332 is sufficiently discharged to allow for taking on additional charge. Where it is determined that operational battery 332 is sufficiently discharged, energy direction controller circuit 325 directs transfer of charge from the opportunistic charging sources where such charge is available. Operational battery 332 supplies power to operational circuitry 342. Such operational circuitry 342 includes, but is not limited to, all of the circuitry performing the various functions discussed above in relation to bracelet monitor 120 of FIG. 1.

Figure 4:
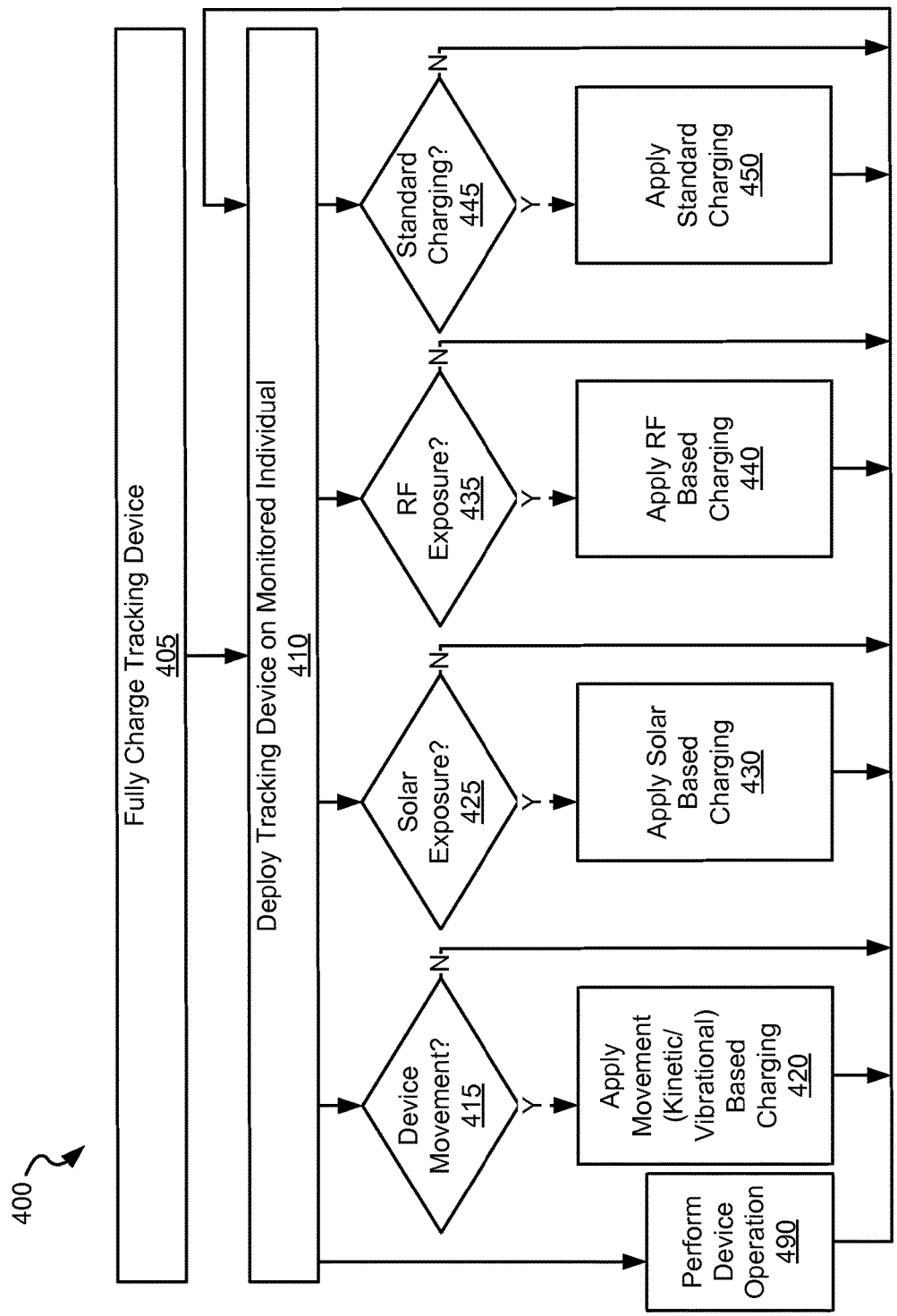
FIG. 4 is a flow diagram depicting a method for monitoring device operation in accordance with some embodiments of the present invention.

Turning to FIG. 4, a flow diagram 400 shows a method for monitoring device operation in accordance with some embodiments of the present invention. Following flow diagram 400, a tracking device is fully charged (block 405). This may include, for example, connecting a tracking device to a standard charger until an operational battery is fully charged. The tracking device is deployed on a monitored individual (block 410). This may include, for example, connecting the tracking device around an appendage of the monitored individual. The operations of the tracking device is performed (block 490). Such operations include, but are not limited to, all of the circuitry performing the various functions discussed above in relation to bracelet monitor 120 of FIG. 1.

It is determined whether the tracking device is moving (block 415). Where the tracking device is moving (block 415), movement based charging is performed (block 420). Such movement based charging can be done using any circuit known in the art that is capable of generating electrical charge from physical movement. The resulting charge may be stored directly to an operational battery, a battery shared by other opportunistic charge sources, of a battery dedicated to storing charge from the device movement based charging circuit.

It is determined whether the tracking device is exposed to light energy including, but not limited to, solar energy (block 425). Where the tracking device is exposed (block 425), solar based charging is performed (block 430). Such solar based charging can be done using any circuit known in the art that is capable of generating electrical charge from light energy. The resulting charge may be stored directly to an operational battery, a battery shared by other opportunistic charge sources, of a battery dedicated to storing charge from the device movement based charging circuit.

It is determined whether the tracking device is exposed to RF energy including, but not limited to, energy from WiFi networks or from RFID readers (block 435). Where the tracking device is exposed (block 435), RF based charging is performed (block 440). Such RF based charging can be done using any circuit known in the art that is capable of generating electrical charge from RF signals. The resulting charge may be stored directly to an operational battery, a battery shared by other opportunistic charge sources, of a battery dedicated to storing charge from the device movement based charging circuit.

It is determined whether the tracking device is connected to a standard charger including, but not limited to, a charger connected to a wall outlet (block 445). Where the tracking device is connected to such a standard charger (block 445), standard charging is performed (block 450). Such standard charging can be done using any circuit known in the art that is capable of transferring electrical charge from one source to another. The resulting charge may be stored directly to an operational battery, a battery shared by other opportunistic charge sources, of a battery dedicated to storing charge from the device movement based charging circuit.

In conclusion, the present invention provides for novel systems, devices, and methods for monitoring individuals and/or assets. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A monitoring system, the monitoring system comprising:
   a monitor device operable to monitor a status of the monitor target and powered by an operational battery;
   a connector device operable to secure the monitor device to the monitor target; and
   wherein the monitor device includes:
      at least a non-opportunistic charge circuit, a first opportunistic charge circuit, and a second opportunistic charge circuit; and
      an energy harvesting circuit operable to direct charge from any of the non-opportunistic charge circuit, the first opportunistic charge circuit, or the second opportunistic charge circuit.

2. The system of claim 1, wherein the monitoring system further comprises:
   a central monitoring computer operable to receive the status of the monitor target from the monitor device.

3. The system of claim 1, wherein the status of the monitor target is selected from a group consisting of: a tamper status of the connector device, a location of the monitor target, and a motion status.

4. The system of claim 1, wherein the non-opportunistic charge circuit is operable to charge the operational battery using charge derived from a wall powered connection under control of the monitor target.

5. The system of claim 1, wherein the first opportunistic charge circuit is selected from a group consisting of: an RF energy based charging circuit, a solar based charging circuit, and a movement based charging circuit.

6. The system of claim 5, wherein the second opportunistic charging circuit generates energy in a different way than that of the first opportunistic charging circuit.

7. The system of claim 1, wherein the second opportunistic charging circuit generates energy in a different way than that of the first opportunistic charging circuit, and wherein the different way energy is generated by the first opportunistic charge circuit is selected from a group consisting of: an RF energy based charging circuit, a solar based charging circuit, and a movement based charging circuit.

8. The system of claim 1, wherein the monitor device further includes a secondary battery associated with at least one of the first opportunistic charge circuit and the second opportunistic charge circuit.

9. The system of claim 8, wherein the monitor device includes circuitry operable to transfer charge from the secondary battery to the operational battery.

10. The system of claim 8, wherein the secondary battery includes a first battery electrically coupled to the first opportunistic charge circuit and a second battery electrically coupled to the second opportunistic charge circuit.

11. A method for tracking an individual, the method comprising:
 charging an operational battery of a monitor device using a non-opportunistic charging circuit;
 attaching the monitor device to the individual using a connector device, wherein the monitor device includes at least two available opportunistic charging circuits;
 monitoring and reporting a status of the individual by the monitor device; and
 charging the operational battery of the monitor device using one or more of the at least two available opportunistic charging circuits.

12. The method of claim 11, wherein the status of the monitor target is selected from a group consisting of: a tamper status of the connector device, a location of the monitor target, and a motion status.

13. The method of claim 11, wherein the non-opportunistic charge circuit is operable to charge the operational battery using charge derived from a wall powered connection under control of the monitor target.

14. The method of claim 11, wherein the first opportunistic charge circuit is selected from a group consisting of: an RF energy based charging circuit, a solar based charging circuit, and a movement based charging circuit.

15. The method of claim 14, wherein the second opportunistic charging circuit is a different type of charging circuit from that of the first opportunistic charging circuit.

16. The method of claim 11, wherein the second opportunistic charging circuit is a different type of charging circuit from that of the first opportunistic charging circuit, and wherein both the first opportunistic charge circuit and the second opportunistic charging circuit are selected from a group consisting of: an RF energy based charging circuit, a solar based charging circuit, and a movement based charging circuit.

17. The method of claim 11, wherein the monitor device further includes a secondary battery associated with at least one of the first opportunistic charge circuit and the second opportunistic charge circuit, and wherein charging the operational battery of the monitor device using one or more of the at least two available opportunistic charging circuits includes transferring charge from the secondary battery to the operational battery.

18. The method of claim 11, wherein the monitor device further includes: a first secondary battery associated with one of the first opportunistic charge circuit and the second opportunistic charge circuit and a second secondary battery associated with another one of the first opportunistic charge circuit and the second opportunistic charge circuit, and wherein charging the operational battery of the monitor device using one or more of the at least two available opportunistic charging circuits includes transferring charge from a selected one of the first and second secondary batteries to the operational battery.

19. A monitoring system, the monitoring system comprising:
 a monitor device operable to monitor a status of the monitor target and powered by an operational battery, wherein the status of the monitor target is selected from a group consisting of: a tamper status of the connector device, a location of the monitor target, and a motion status;
 a connector device operable to secure the monitor device to the monitor target;
 a central monitoring computer operable to receive the status of the monitor target from the monitor device; and
 wherein the monitor device includes:
  at least a non-opportunistic charge circuit, a first opportunistic charge circuit, and a second opportunistic charge circuit; and
  an energy harvesting circuit operable to direct charge from any of the non-opportunistic charge circuit, the first opportunistic charge circuit, or the second opportunistic charge circuit.

20. The system of claim 19, wherein the second opportunistic charging circuit is a different type of charging circuit from that of the first opportunistic charging circuit, and wherein both the first opportunistic charge circuit and the second opportunistic charging circuit are selected from a group consisting of: an RF energy based charging circuit, a solar based charging circuit, and a movement based charging circuit.

* * * * *